No. 774,837. PATENTED NOV. 15, 1904.
E. H. ESHELMAN.
REVERSING MECHANISM.
APPLICATION FILED MAR. 22, 1904.
NO MODEL. 3 SHEETS—SHEET 1.

Witnesses
Inventor
Edward H. Eshelman
by
Knight Bros.
Attorneys

No. 774,837. PATENTED NOV. 15, 1904.
E. H. ESHELMAN.
REVERSING MECHANISM.
APPLICATION FILED MAR. 22, 1904.
NO MODEL. 3 SHEETS—SHEET 2.

Witnesses

Inventor
Edward H. Eshelman
By Knight Bros.
Attorneys

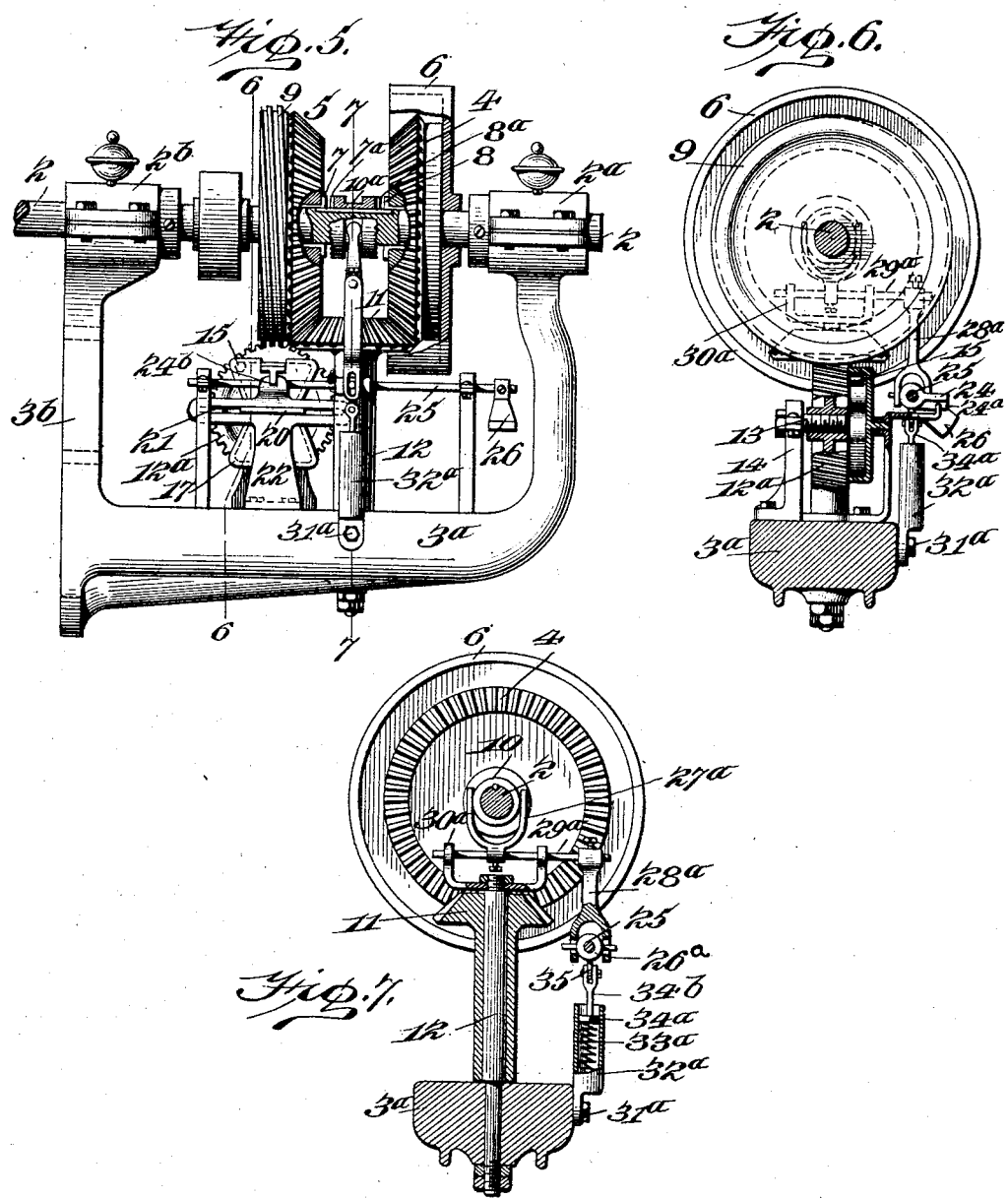

No. 774,837.  Patented November 15, 1904.

UNITED STATES PATENT OFFICE.

EDWARD H. ESHELMAN, OF CRAWFORDSVILLE, INDIANA.

REVERSING MECHANISM.

SPECIFICATION forming part of Letters Patent No. 774,837, dated November 15, 1904.

Application filed March 22, 1904. Serial No. 199,462. (No model.)

*To all whom it may concern:*

Be it known that I, EDWARD H. ESHELMAN, a citizen of the United States, residing at Crawfordsville, in the county of Montgomery, State of Indiana, have invented certain new and useful Improvements in Reversing Mechanism, of which the following is a specification.

This invention relates to motion-reversing mechanism; and it has for one of its objects to provide a means whereby the time required to make a change from one direction of rotation to another direction of rotation is reduced to a minimum.

A further object is to improve the construction of mechanisms of this kind.

Other objects and advantages will appear from the following description and will be particularly pointed out in the claims.

Figure 1:
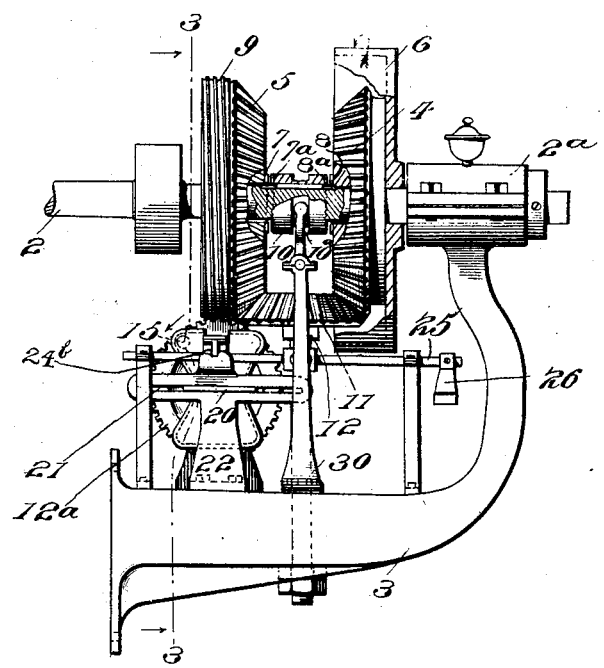
Figure 2:
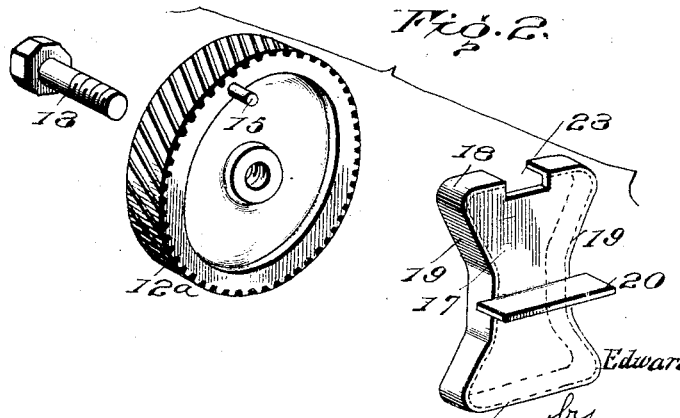
Figure 3:
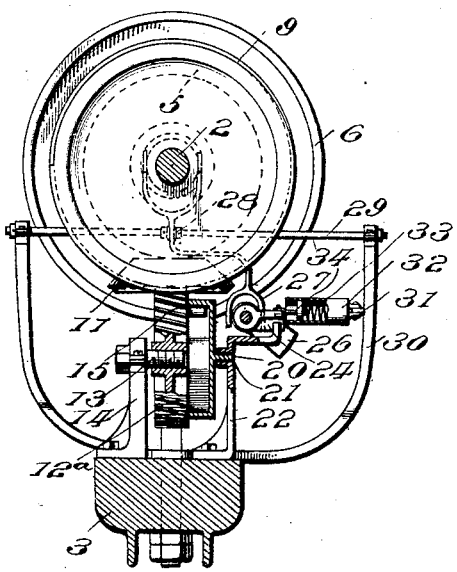
Figure 4:
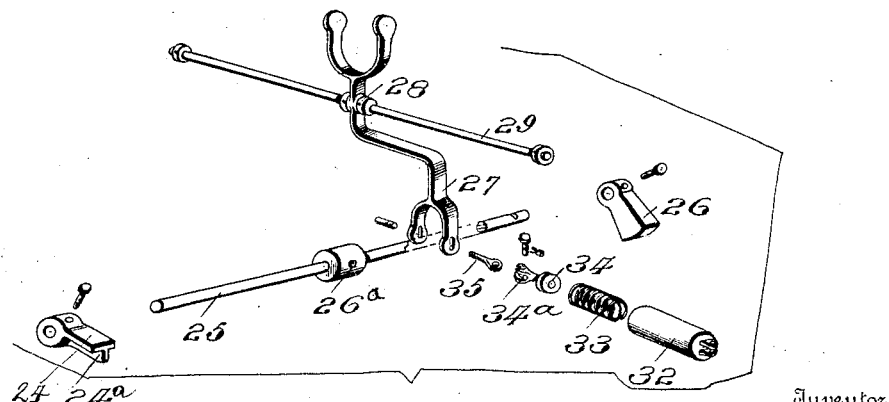

In the drawings, Figure 1 is a side view of one embodiment of my invention, partly in section. Fig. 2 is a perspective view of details of the embodiment of my invention shown in Fig. 1 in a position to be assembled. Fig. 3 is a transverse sectional view on the line 3 3 of the view shown in Fig. 1, and Fig. 4 is a detached perspective view of other details of the embodiment of my invention shown in Figs. 1 to 3. Fig. 5 is a side view of another embodiment of my invention. Fig. 6 is a transverse sectional view on the line 6 6 of the embodiment shown in Fig. 5. Fig. 7 is a transverse sectional view on the line 7 7, Fig. 5.

In the embodiment shown in Figs. 1 to 4, 2 designates the shaft to be driven, which at its outer end is supported in a bearing $2^a$ on an L-shaped bracket 3, which is secured to any suitable support. Loosely mounted on the shaft 2 is a pair of bevel-gears 4 and 5, said gears being held against axial movement, spaced apart on said shaft, and provided with clutch members 7 8 on their adjacent faces. The gear 4 has connected to it a power-wheel 6, through which power is applied to run the machine, while the gear 5 is provided with a worm 9 on its periphery. A sleeve 10, provided with a circumferential groove $10^a$ and clutch members $7^a$ and $8^a$ at its ends, is feathered on the shaft 2 to rotate therewith, but to slide thereon, and a bevel-gear 11, journaled on a stud 12 on the bracket 3, communicates motion between the gears 4 and 5. Geared to the worm 9 is a worm-wheel $12^a$, supported on a stud 13, journaled in a standard 14, which is also mounted on the bracket 3. This worm-wheel $12^a$ is provided with a pin 15, which works against the inner wall of a hollow sliding cam 17 of peculiar form, two opposite inner walls 18 being approximately straight, while the other two opposite walls 19 gradually turn in from each end toward the center. On the rear side of the cam is a flat strip 20, which works in a guide-slot 21 in a frame 22, also mounted on the bracket 3, while the top of the cam is notched at 23 for the reception of an arm 24 on a reciprocating rod 25, also mounted on the bracket 3. This reciprocating rod 25 is provided with a weight 26, which holds said arm 24 into engagement with the notch 23 when in one position and out of engagement with said notch when the reciprocating rod 25 is partially rotated. The reciprocating rod 25 has loosely hinged to it at $26^a$ a clutch-lever 27, secured at 28 on a rock-shaft 29, which is journaled in two standards 30, also mounted on the bracket 3. The other end of the clutch-lever 27 loosely fits within the groove $10^a$ on the sliding clutch-sleeve. At 31 on one of the standards 30 and in vertical alinement with the rock-shaft 29 or fulcrum of the pivoted lever is pivoted at one of its ends a casing 32, containing a spiral spring 33 and having working therein a follower 34, pivoted at $34^a$ to an eyebolt 35, which secures the lever 27 to the rod 25.

The operation of the invention is as follows: Power being applied through any suitable means to drive the power-wheel 6 in any direction—say, for example, in the direction of the arrow—the clutch members 7 and $7^a$ being in engagement and the spring 33 being expanded and having its end which is secured to the reciprocating rod 25 to the right-hand side of its pivot, the worm 9 and shaft 2 will rotate in a direction opposite to the power-wheel 6, and the worm-wheel (see Fig. 1) will rotate anti-clockwise. This carries the sliding cam 17 and reciprocating rod 25 to the left and also the pivoted end 34ª of the spring 33, thereby compressing said spring until the spring is at right angles to the reciprocating rod. After the cam 17 carries the pivoted end of the spring slightly past this point the spring suddenly expands again and shoots the reciprocating rod 25 and cam 17 forward independently of the worm-wheel pin, thereby making connection between the clutch members 8 and 8ª and reversing the direction of rotation of the shaft. This operation is now repeated, but in a reverse direction. If it is desired to disconnect the mechanism, the weight 26 is grasped and the reciprocating rod 25 is partially rotated to disconnect the arm 24 from the cam 17, and the lug 24ª is thrown into a recess 24ᵇ on the frame 22.

In the embodiment shown in Figs. 5, 6, and 7 the bracket 3ª is approximately U-shaped to provide in addition to the journal-bearing 2ª a bearing 2ᵇ and an attaching-plate 3ᵇ. The other parts of the device, except the connection between the reciprocating rod 25 and the sleeve 10, are the same as in Figs. 1 to 4. In this form the standards 30 are dispensed with and in their place is provided a U-shaped frame 30ª, mounted on top of the stud 12 above the bevel-wheel 11. The shaft 29 is replaced by a shorter rock-shaft 29ª, to which is secured a pivoted clutch-lever, which comprises a yoke 27ª, connecting the sleeve 10 and the shaft 29ª, and a rocking arm 28ª, connecting the shaft 29ª to the reciprocating rod 25. Pivoted to the frame 3ª at 31ª directly beneath the shaft 29ª is the casing 32ª, which is constructed similarly to the casing 32 of Figs. 1 to 4 and has mounted therein a spring 33ª, against one end of which works the plunger 34ᵇ, which in turn is connected to the reciprocating rod 25. The operation of this embodiment of my invention is the same as the embodiment shown in Figs. 1 to 4, the construction of the parts only being different.

It will be seen that I have provided a construction in which a minimum number of parts are required and a very small space is taken up by the arrangement of the parts.

It will be understood that I do not wish to be limited to the form or arrangement of the parts herein specified and that I may make any changes commensurate with the appended claims without departing from the spirit or sacrificing any of the advantages of my invention.

Having described my invention, what I claim as new therein is the following:

1. In a motion-reversing mechanism, the combination with the shaft and a pair of gears, of a clutch for alternately connecting the gears to the shaft to turn therewith, a spring-casing pivoted to a fixed support, a spiral spring within the casing, a follower movable within the casing and pivotally connected with the clutch, and means operated automatically when the motion-reversing mechanism is in operation for disconnecting from one of the gears and compressing the spring, said means permitting the spring thus compressed to move said clutch into engagement with the other gear.

2. In a motion-reversing mechanism, the combination with an approximately U-shaped bracket, of a shaft journaled in the ends of the bracket, a pair of bevel-gears loosely journaled on the shaft, a stud extending from the U-shaped bracket, a bevel-gear journaled on the stud and meshing with the other bevel-gears, a clutch for causing either of the bevel-gears on the shaft to turn therewith and a clutch-lever pivoted to the stud.

3. In a motion-reversing mechanism, the combination with the shaft, and a pair of gears, of means for alternately connecting the gears to the shaft to turn therewith, a reciprocating rod moved by the mechanism and connected to said connecting means for moving the same, and a spring pivotally connected at one end to a fixed support and at its other end to the rod.

4. In a motion-reversing mechanism, the combination with the shaft, and a pair of gears, of means for alternately connecting the gears to the shaft to turn therewith, a reciprocating rod moved by the mechanism and connected to said connecting means for moving the same, a spring-casing, pivoted to a fixed support, a spiral spring within the casing and a follower movable within the casing and pivotally connected to the reciprocating rod.

5. In a motion-reversing mechanism, the combination with the shaft, and a pair of gears journaled on said shaft, having their adjacent faces provided with clutch members, of a sleeve provided with clutch members at each end and slidably mounted on the shaft but turning therewith, a pivoted clutch-lever engaging at one end with the sliding sleeve, a reciprocating rod connected to the other end of the clutch-lever and moved by the mechanism, and a spring connected at one end to a fixed support and at its other end to the reciprocating rod.

6. In a motion-reversing mechanism, the combination with the shaft, and a pair of gears journaled on said shaft, having their adjacent faces provided with clutch members, of a sleeve provided with clutch members at each end and slidably mounted on the shaft but turning therewith, a pivoted clutch-lever engaging at one end with the sliding sleeve, a reciprocating rod connected to the other end of the clutch-lever and moved by the mechanism, a spring-casing pivoted to a fixed support, a spiral spring mounted within the casing, and a follower working in the casing and pivoted to the sliding rod.

7. In a motion-reversing mechanism, the combination with the shaft, and a pair of gears, of means for alternately connecting the gears on the shaft to turn therewith, a reciprocating rod connected to the connecting means, for moving the same, a cam for moving the reciprocating rod, moved by the mechanism, and means for disconnecting the rod from the cam.

8. In a motion-reversing mechanism, the combination with the shaft, and a pair of gears journaled on said shaft, having adjacent faces provided with clutch members, of a sleeve provided with clutch members at each end and slidably mounted on the shaft but turning therewith, a pivoted clutch-lever engaging at one end to the sliding sleeve, a reciprocating rod connected to the other end of the clutch-lever and capable of a partial rotation, a sliding cam moved by the mechanism and provided with a notch, and an arm on the reciprocating rod adapted to fit in the notch.

9. In a motion-reversing mechanism, the combination with the shaft, and a pair of gears journaled on said shaft, having adjacent faces provided with clutch members, of a sleeve provided with clutch members at each end, and slidably mounted on the shaft but turning therewith, a pivoted clutch-lever engaging at one end to the sliding sleeve, a reciprocating rod connected to the other end of the clutch-lever and capable of a partial rotation, a sliding cam moved by the mechanism and provided with a notch, an arm on the reciprocating rod adapted to fit in the notch, and a weight on the reciprocating rod adapted to hold the arm in or out of the notch.

10. In a motion-reversing mechanism, the combination with the shaft, and a pair of gears journaled on said shaft, having adjacent faces provided with clutch members, of a sleeve provided with clutch members at each end and slidably mounted on the shaft but turning therewith, a pivoted clutch-lever engaging at one end to the sliding sleeve, a reciprocating rod connected to the other end of the clutch-lever and capable of a partial rotation, a sliding cam moved by the mechanism and provided with a notch, an arm on the reciprocating rod adapted to fit in the notch, and a spring pivotally connected at one end to a fixed support and at its other end to the rod.

11. In a motion-reversing mechanism, the combination with the shaft, and a pair of gears, of means for alternately connecting the gears on the shaft to turn therewith, a reciprocating rod connected to the connecting means, for moving the same, a cam for moving the reciprocating rod, moved by the mechanism and provided with a notch, and an arm on the reciprocating rod, fitting in the notch in the cam.

12. In a motion-reversing mechanism, the combination with the shaft, of a pair of bevel-gears journaled on said shaft, and provided with clutch members on their adjacent faces, a bevel-gear connecting the pair of bevel-gears, a sleeve provided with clutch members at each end, and slidably mounted on the shaft but turning therewith, a pivoted clutch-lever engaging at one end with the sliding sleeve, a reciprocating rod connected to the other end of the pivoted lever, an arm on the reciprocating rod, a sliding cam provided with a notch in which the arm on the reciprocating rod fits, a worm-wheel provided with a pin working on the cam, a worm on one of the gear-wheels, meshing with the worm-wheel, a spring-casing pivoted to a fixed support, a spiral spring within the casing, and a follower pivoted to the reciprocating rod and movable in the casing.

The foregoing specification signed this 29th day of February, 1904.

EDWARD H. ESHELMAN.

In presence of—
 C. W. BROWN,
 STELLA I. BROWN.